United States Patent [19]

Pflüger et al.

[11] Patent Number: 4,676,666
[45] Date of Patent: Jun. 30, 1987

[54] COVER FOR PARALLEL GUIDE MEANS, ESPECIALLY IN MACHINE TOOLS

[75] Inventors: Helmut Pflüger; Werner Sonnek, both of Lichtenwald, Fed. Rep. of Germany

[73] Assignee: Traub AG, Fed. Rep. of Germany

[21] Appl. No.: 895,784

[22] Filed: Aug. 12, 1986

[30] Foreign Application Priority Data

Aug. 30, 1985 [DE] Fed. Rep. of Germany ....... 3531140

[51] Int. Cl.$^4$ ............................................. F16C 29/08
[52] U.S. Cl. .................................................... 384/15
[58] Field of Search .................. 384/15, 16, 151, 477, 384/607; 160/84 R; 277/212 R

[56] References Cited

U.S. PATENT DOCUMENTS

| | | | |
|---|---|---|---|
| 3,446,539 | 5/1969 | Sartorio | 384/15 |
| 3,788,377 | 1/1974 | Knowles | 160/84 R |
| 3,920,288 | 11/1975 | Ito | 384/15 |
| 4,522,246 | 6/1985 | Bierbrauer et al. | 384/15 |

Primary Examiner—Lenard A. Footland
Attorney, Agent, or Firm—Webb, Burden, Robinson & Webb

[57] ABSTRACT

At least two telescopically interengaging cover members (20, 22 or 30, 32, 34) are associated with each of two or more parallel guide means (12, 14). They are displaceable with respect to each other irrespective of the cover members of the or each other guide means. The cover members (20, 22) of a first one (12) of two adjacent guide means (12, 14) each comprise an elastic apron (26) along their respective edge facing the second one (14) of these guide means. The apron lies in sliding contact on the cover members (30, 32, 34) of the second guide means (14). In this manner the or each space between guide means (12, 14) is covered in addition to the guide means themselves. And yet the cover members (20, 22 or 30, 32, 34) associated with the different guide means (12, 14) remain movable independently.

3 Claims, 2 Drawing Figures

U.S. Patent  Jun. 30, 1987  4,676,666
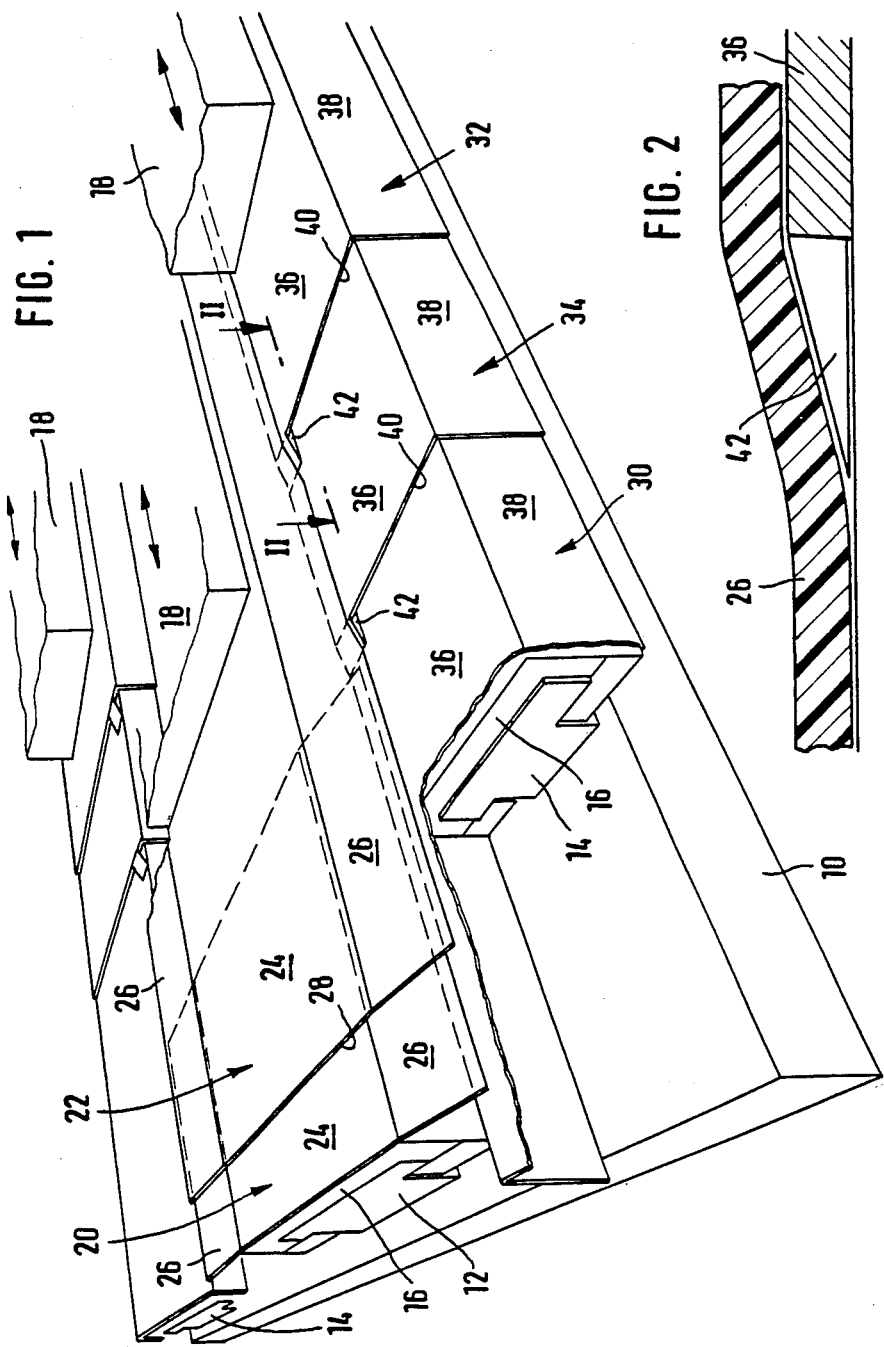

COVER FOR PARALLEL GUIDE MEANS, ESPECIALLY IN MACHINE TOOLS

The invention relates to a cover for parallel guide means, especially in machine tools with which at least two cover members in telescopic engagement with each other are associated with each guide means and are displaceable with respect to each other, irrespective of the cover members of the or each other guide means.

As regards covers of the kind with which the instant invention is concerned, the term guide means used in connection with the same is understood to refer to any slideways or roller trains for guiding purposes which are customary above all with cutting machine tools. Covers of the generic kind in question serve for protecting the associated guide means from damage or contamination and/or the persons working within the range of such guide means from injuries or accidents.

Two or more guide means requiring the type of protection independently of each other frequently are arranged in parallel with but little spacing in between. Roller grinding machines and turning lathes may be mentioned as examples of such arrangement. They comprise a guide means each for a tailstock carriage and at least one tool carrier slide. The individual slides or carriages are movable independently of each other along their respective guide means so that the movable cover members of each guide member also must be displaceable independently of the cover members of each other guide means. This requirement was met up to now by totally separate coverse spaced side by side and associated with the respective individual parallel guide means. What cannot be excluded in this manner is that dirt entering into the spaces between the covers of adjacent guide means will gradually progress also to the guide means. Moreover, narrow spacings present a hazard of accidents occurring at least if the covers are of the walk-on type.

It is, therefore, an object of the instant invention to design a cover of the type specified initially such that it will span two or more guide means, including any spacings between them, without impeding any independent movements of movable members disposed on the guide means, such as machine slides.

The object is met, in accordance with the invention in that the cover members of a first one of two adjacent guide means each comprise an elastic apron along their respective edge facing the second one of the guide means, the apron being in sliding contact on the cover members of the second guide means.

In a particularly convenient embodiment of the invention each cover member of the second guide means engaged by another cover member of the same guide means comprises a ramp which reaches out over said other cover member and under the apron of at least one cover member of the first guide member.

Furthermore, it is advantageous if the sloping of the ramps is adapted to the configuration which the elastic aprons adopt by themselves at the transition between two directly interengaging cover members of the second guide means.

The invention will be described further, by way of example, with reference to the accompanying drawing, in which:

FIG. 1 is an oblique elevational view of guide means arranged on a lathe and

FIG. 2 is a part sectional view along lines II—II of FIG. 1.

The guide assembly shown includes three guide means, namely a central guide means 12 and two lateral guide means 14 all arranged on a common base plate 10. As the two lateral guide means 14 and the structural members directly associated with them and to be described below are alike, they are provided with like reference numerals.

A terminal piece 16 each is fixed at the end of each guide means 12 and 14 facing the onlooker of FIG. 1. Corresponding terminal pieces are fixed also to the other ends (not shown) of each guide means. A carriage 18 is slidingly movable on each guide means 12 and 14, respectively, between the terminal pieces 16 thereof. The carriage 18 sliding on the central guide means 12, for instance, is a tailstock slide, while the carriages 18 on the two lateral guide means 14 may be turret slides.

A stationary cover member 20 each is fixed to the terminal pieces 16 of the central guide means. Of these cover members only the one facing the onlooker is shown in FIG. 1. A movable cover member 22 is fixed to the corresponding carriage 18, and it is in telescopic engagement with both stationary cover members 20 over each of which it reaches out. Each cover member 20 and 22 is made in one piece, the material being spring steel, and it has a rigid central portion 24 as well as two lateral aprons 26. The aprons 26 or their lower edges also may be made of rubber-like elastic plastics. For the sake of simplicity, the central portions 24 are shown as flat plates. However, they may be folded or bent in conventional manner for stiffening. The central portion 24 of the movable cover member 22 may include a wiper member 28 each at its free edges to prevent chips, cutting emulsions, and the like from entering between the cover members 20 and 22.

A stationary cover member 30 each is fixed to each terminal piece 16 of the lateral guide means 14, while a movable cover member 32 is fixed to the corresponding carriage 18 to slide together with the same. Another cover member 34 each is disposed between each stationary cover member 30 and the corresponding displaceable cover member 32. This additional cover member 34 is displaceable with respect to both the cover members 30 and 32 and it extends over the cover member 30 and engages into the cover member 32.

The cover members 30, 32, and 34 are made in conventional manner of sheet steel and each configured like a box, having a top 36 and two lateral depending sidewalls 38 bent at an angle. At their front edges which reach out over the next smaller cover member 34 or 30, respectively, the cover members 32 and 34 each comprise a wiper member 40 which is secured to the top 36 and sidewalls 38, lying slidingly on the corresponding portions of the next smaller cover member 34 or 30.

The spring-like elastic aprons 26 of each cover member 20 and 22 lie on the surface of the top 36 of the cover member 30, 32, and 34, respectively, of the adjacent guide means 14, along their edges which are remote from the corresponding central portions 24. In this manner the aprons 26 bridge the spaces between the central guide means 12 and each of the two lateral guide means 14, whereby risks of contamination or accidents are excluded.

True, the aprons 26 do not fully adapt to the steplike transition between directly interengaging cover members 30 and 34 or 34 and 32. Thus a ramp 42 each is arranged at the tops 36 of each cover member 32 and 34 in the area in which these tops are contacted by the aprons 26 in order to avoid that any side openings at these transitions remain uncovered through which minor amounts of dirt might pass under the aprons 26.

As may be taken especially from FIG. 2, these ramps 42 are approximately triangular in cross sectional profile, the shape being adapted to the configuration which the aprons 26 will adopt by themselves at the transition between two cover members 30 and 34 or 34 and 32 in direct mutual engagement. The space betwen the apron 26 lying on the surface of a ramp 42 and the top 36 underneath the same is closed at least approximately completely by each ramp 42.

What is claimed is:

1. A cover for parallel guide means (12,14), especially in machine tools with which at least two cover members (20, 22 or 30,32,34) in telescopic engagement with each other are associated with each guide means (12,14) and are displaceable with respect to each other, irrespective of the cover members of the or each other guide means, characterized in that the cover members (20,22) of a first one (12) of two adjacent guide means (12,14) each comprise an elastic apron (26) along their respective edge facing the second one (14) of the guide means, the apron being in sliding contact on the cover members (30,32,34) of the second guide means (14).

2. The cover as claimed in claim 1, characterized in that each cover member (32,34) of the second guide means (14) engaged by another cover member (34 or 30) of the same guide means (14) comprises a ramp (42) which reaches out over said other cover member and under the apron (26) of at least one cover member (20,22) of the first guide member (12).

3. The cover as claimed in claim 2, characterized in that the sloping of the ramps (42) is adapted to the configuration which the elastic aprons (26) adopt by themselves at the transition between two directly interengaging cover members (30,34 or 34,32) of the second guide means (14).

* * * * *